July 3, 1962
E. C. YOKEL
3,042,165
FLUID ACTUATED FRICTION CLUTCH
Filed May 1, 1957
5 Sheets-Sheet 1
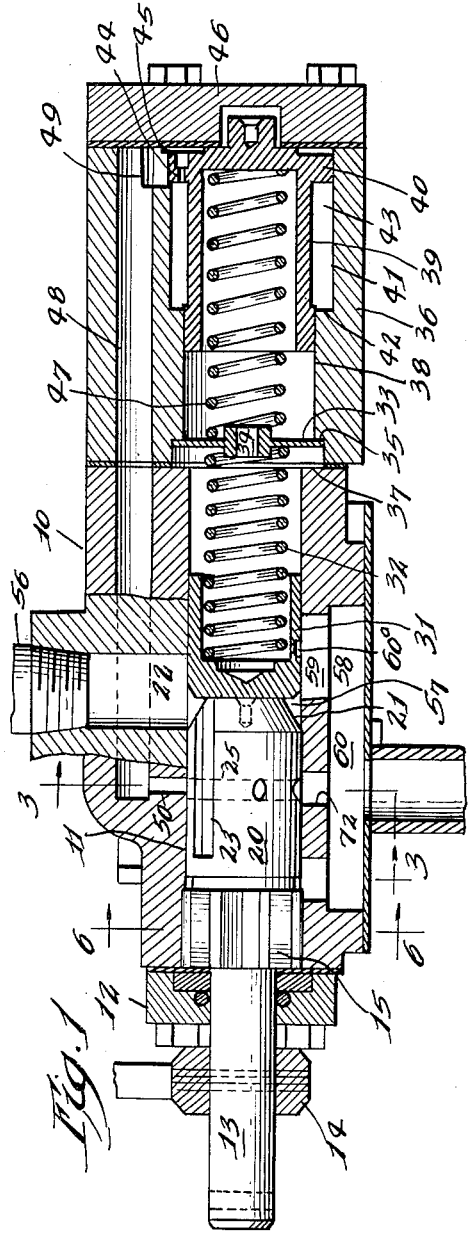
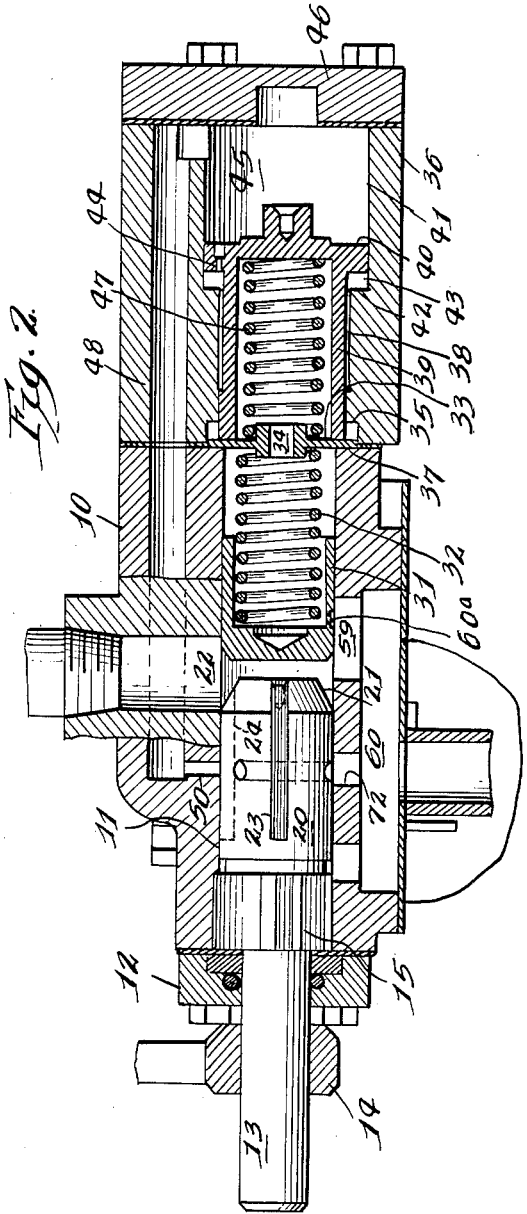
Inventor.
Edward C. Yokel.
By John M. Darley
Attorney.

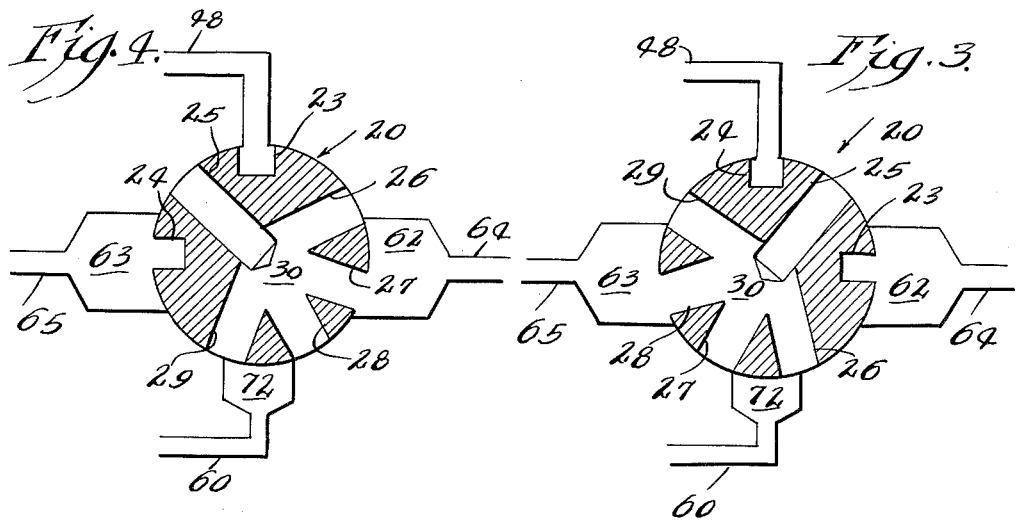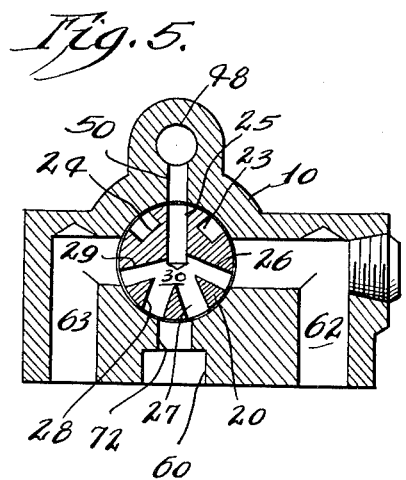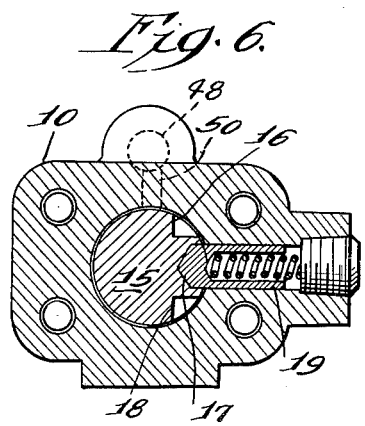

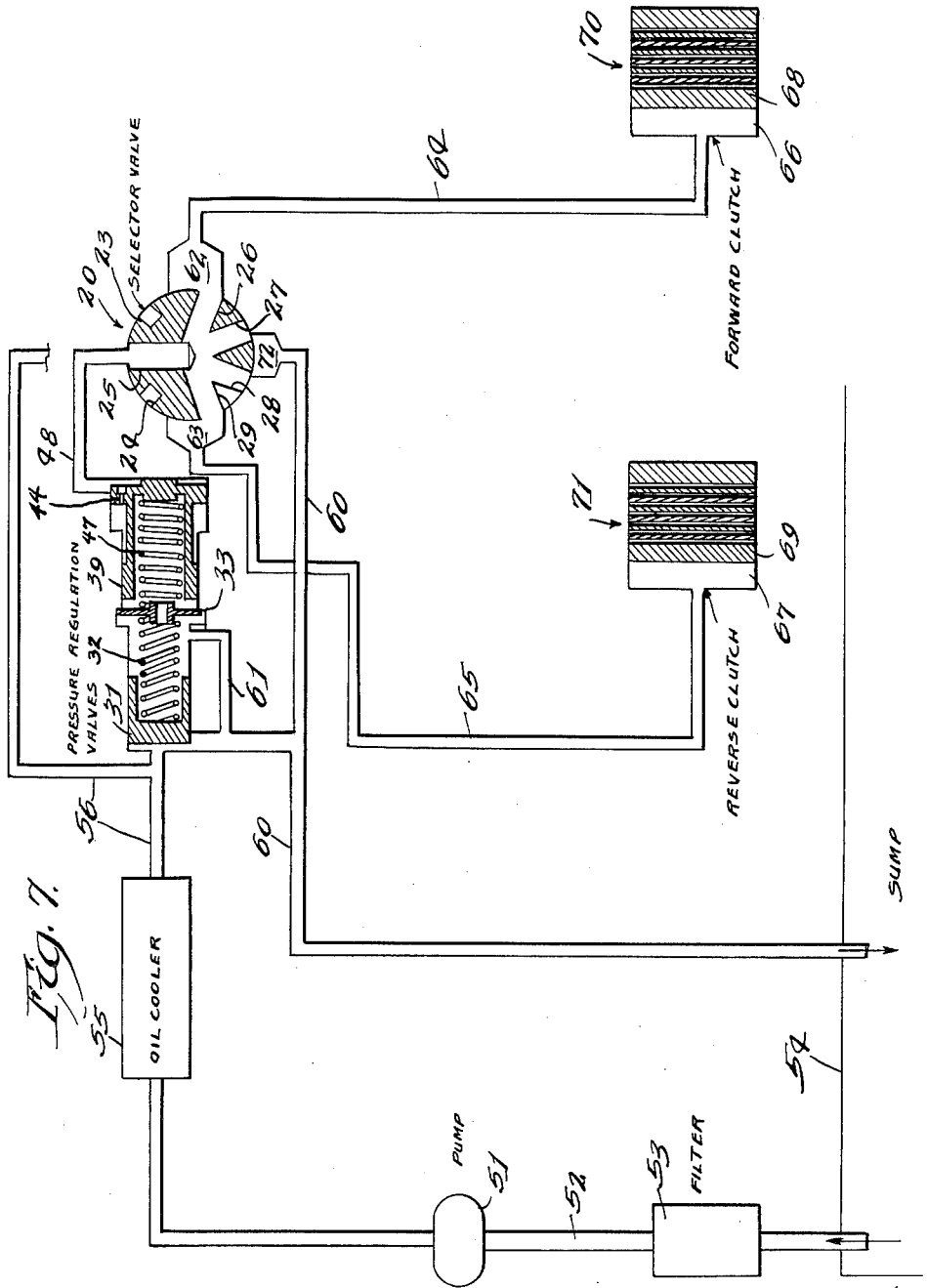

July 3, 1962 — E. C. YOKEL — 3,042,165
FLUID ACTUATED FRICTION CLUTCH
Filed May 1, 1957 — 5 Sheets-Sheet 4

Inventor,
Edward C. Yokel.
By John D. Darley
Attorney.

Inventor.
Edward C. Yokel.
By John W Darley
Attorney.

United States Patent Office 3,042,165
Patented July 3, 1962

3,042,165
FLUID ACTUATED FRICTION CLUTCH
Edward C. Yokel, Racine, Wis., assignor to Twin Disc Clutch Company, Racine, Wis., a corporation of Wisconsin
Filed May 1, 1957, Ser. No. 656,739
14 Claims. (Cl. 192—85)

My invention relates to fluid actuated clutches of the friction type and more particularly to an arrangement for materially reducing shock when the clutch plates are moved to engaging position.

Friction clutches of the fluid actuated type wherein a plurality of friction plates are engaged by applying a fluid pressure to a plate engaging piston are characterized by an operating difficulty which is objectionable under certain conditions of use. The plates are customarily released by springs and in such position, the clutch cylinder is devoid of pressure. For example, in an oil pressure actuated clutch, the cylinder thereof is empty or nearly so when the clutch is released.

When the control valve is opened to connect the cylinder with the source of pressure, the beginning pressure in the cylinder is relatively low and substantially less than the eventual peak engaging pressure. This is due to the fact that the initial movement of the clutch piston is exerted against relatively light resistance, it being only necessary to take up the plate clearance and overcome the opposing pressure of the release springs. Thereafter, when the plates are in contact, the pressure in the cylinder rises very rapidly to the regulated engaging pressure. It is this rapid rise which is objectionable because the clutch plates engage with a substantial jerk or shock.

It is therefore one object of my invention to provide a fluid actuated, friction clutch in which shock engagement of the clutch plates is prevented by delaying the rise in pressure acting against the piston which engages the plates.

A further object is to provide a clutch of the character indicated in which the pressure rise in the clutch cylinder is under definite control at all times regardless of the speed at which the control or selector valve is moved to open the pressure line to the cylinder.

A further object is to provide a clutch as above which is associated with a spring loaded, pressure regulating valve for determining the maximum actuating pressure for the clutch and fluid actuated means for delaying rise in the clutch actuating pressure to its final regulated value by a controlled conditioning of the regulating valve spring.

A further object is the provision of a combination unit for a fluid actuated clutch which includes a control or selector valve, a pressure regulating valve of the spring loaded type operably related to the selector valve and fluid actuated means for delaying pressure rise by a controlled shortening of the regulating valve spring.

These and further objects of the invention will be set forth in the following specification, reference being had to the accompanying drawings, and the novel means by which the objects are effectuated will be definitely pointed out in the claims.

In the drawings:

FIG. 1 is an enlarged, sectional elevation of the combination unit including the selector valve, pressure regulating valve and preloading piston, all in neutral position.

FIG. 2 is a section similar to FIG. 1, but showing the several parts in positions assumed when the associated clutch is engaged.

FIGS. 3 and 4 are enlarged, transverse and diagrammatic sections of the selector valve taken along the line 3—3 in FIG. 1 and showing, respectively, and by way of example positions occupied thereby for determining engagement of the forward and reverse clutches of a marine gear.

FIGS. 5 and 6 are sections along the lines 3—3 and 6—6, respectively, in FIG. 1.

FIG. 7 is a schematic view of a typical hydraulic circuit including a pair of clutches, the selector and pressure regulating valves.

Figure 8:
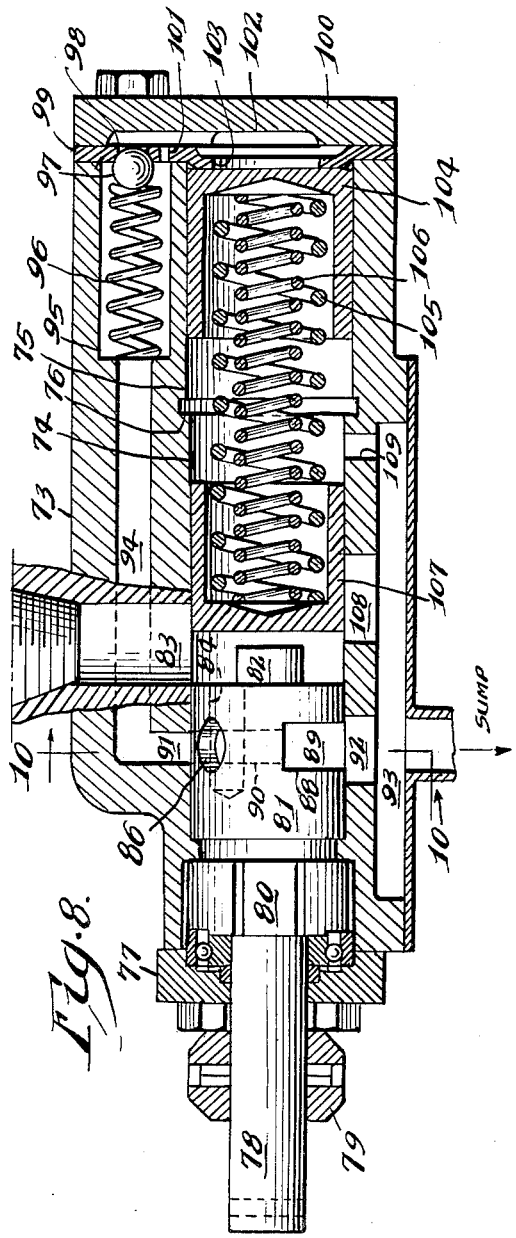
Figure 9:
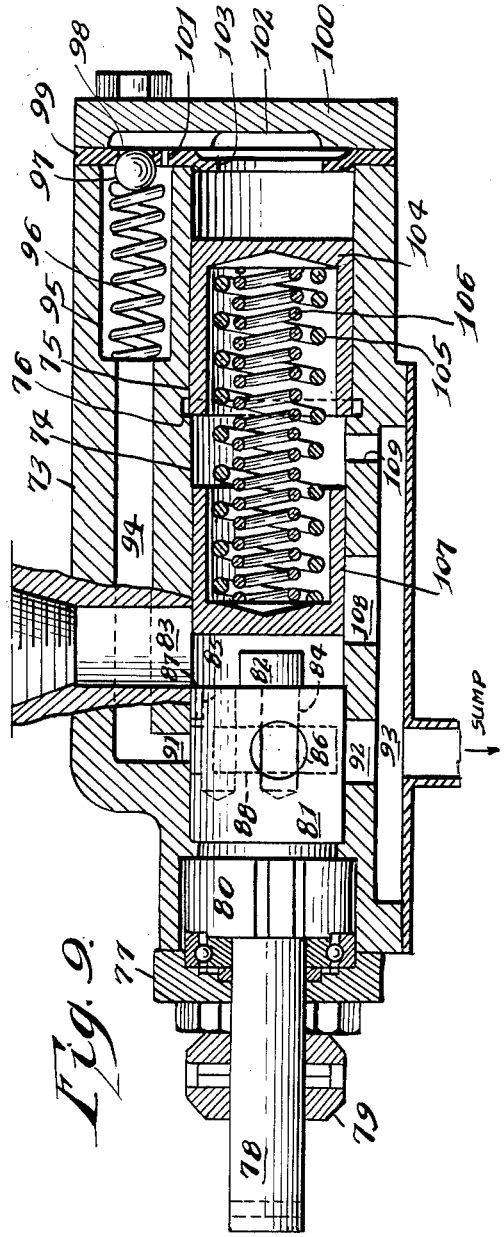

FIGS. 8 and 9 are sectional elevations of a modified control combination unit in clutch neutral and engaged positions corresponding to FIGS. 1 and 2, all respectively.

Figure 10:
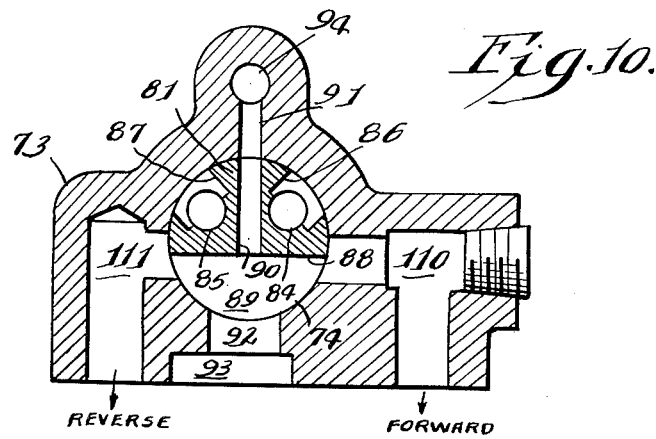
Figure 11:
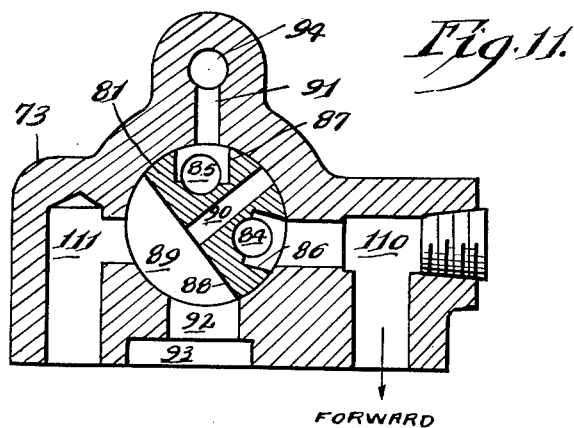
Figure 12:
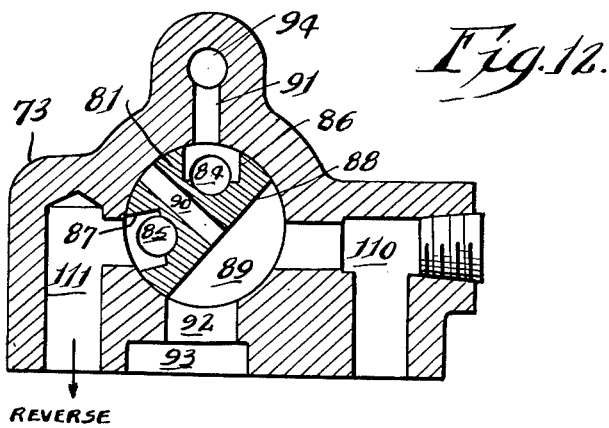

FIGS. 10, 11 and 12 are sections along the line 10—10 in FIG. 8 showing positions of the selector valve for determining neutral and engagement of the forward and reverse clutches, respectively.

This application is a continuation-in-part of my copending application for Fluid Actuated Friction Clutch, Ser. No. 430, 817, filed May 19, 1954, now abandoned.

For illustrative purposes, the combination unit as defined above will be described in connection with a hydraulic circuit including oil pressure actuated, forward and reverse clutches forming part of a marine gear, but the broadest aspects of the invention include one clutch only as well as the control unit therefor.

Referring to FIG. 1, the numeral 10 designates an elongated casing having a cylindrical bore 11 extending therethrough whose left end is closed by a plate 12. A rockable stem 13 extends through the plate 12 and its outer or left end is attached to an actuating handle 14 while inwardly of the bore 11, the stem 13 is enlarged to provide a cylindrical portion 15 (see FIGS. 1 and 6) whose periphery is provided with circumferentially spaced notches 16, 17 and 18 which are selectively engaged by a spring actuated pawl 19 slidable in the casing 10 to respectively determine forward drive, neutral and reverse drive.

Adjacent the notched portion 15 and integrally formed therewith is a cylindrical selector valve 20 which snugly fits the bore 11 and whose right end is beveled at 21 and always registers with a pressure inlet port 22 provided in the casing. A pair of spaced grooves 23 and 24 (see FIGS. 1 and 5) are cut radially inward from the periphery of the selector valve 20 and extend from the right end of and for a predetermined distance along the surface of this valve.

Also provided in the valve 20 and at a convenient distance from the right end thereof is a plurality of coplanar, radial passages which are located transversely of the valve. One such passage 25 (see FIG. 5) extends from the central portion of the valve 20 and terminates at the periphry thereof between and equidistant from the grooves 23 and 24 while the other passages 26, 27, 28 and 29 fan out from the central portion of the valve 20 and on the opposite side of the transverse diameter from which the passage 25 extends and the outer ends of the former passages also terminate at the periphery of the valve. As shown in FIGS. 3, 4 and 5, the inner ends of the passages 25 to 29, inclusive, intersect to form a central chamber 30 so that these passages are always in communication with each other.

A cup-shaped, pressure regulating valve 31 is slidable in the bore 11 and its head is biased into contact with the right or exposed end of the selector valve 20 in the neutral position shown in FIG. 1 by a spring 32 interposed between the head of the valve 31 and a follower disk 33 which is centrally apertured at 34. The disk 33 is restrained from further movement towards the right by engagement with a shoulder 35 provided in the adjacent end of an elongated auxiliary casing 36 which is suitably held in abutting relation to the adjacent end of the casing 10. The disk 33 is conditioned for an axial movement relative to the pressure regulating valve 31 and this movement towards the left is limited by the adjacent end face 37 of the casing 10.

The casing 36 includes a bore 38 which is coaxial with and larger in diameter than the bore 11 for a purpose presently explained and slidable in the former bore is the left end of a cup-shaped, preloading piston 39 whose opposite or head end carries an annular rib 40 having a diameter larger than that of the bore 38 and which is slidable in a bore 41 that is coaxial with the bore 38. The junction of the bores 38 and 41 creates an annular shoulder 42 which together with the skirt of the piston 39, casing 36 and rib 40 define an annular chamber 43 which communicates through a throttling orifice 44 in the rib 40 with a chamber 45 included between the head of the piston 45 and a cover plate 46 secured to the auxiliary casing and closing the adjacent end of the bore 41. The preloading piston 39 is held in the neutral position shown in FIG. 1 by a helical spring 47 interposed between the follower disk 33 and the head of the piston 39, the spring 47 being weaker than the spring 32.

The casings 10 and 36 include mating passages which may be regarded as a single passage 48 whose opposite ends connect respectively through a port 49 with the chamber 45 and with a transverse passage 50 which terminates at the bore 11 in the same plane which includes the passages 25 to 29, inclusive. As shown in FIGS. 1 and 5, the passage 50 and hence the passage 48 connects with the radial passage 25 in the particular position of the selector valve 20.

The parts above described and others are linked in a hydraulic circuit shown diagrammatically in FIG. 7 to which reference will now be made.

An oil pump, suitably driven by the engine, has its intake connected through a pipe 52 and a filter 53 with a sump 54 which may be constituted by the housing of the marine gear or may be otherwise provided and the discharge side of the pump 51 connects with a cooler 55. For convenience in showing flow relations, the selector valve 20 and the unit including the valves 31 and 39 are shown separated, but are actually related as shown in FIG. 1.

The cooler 55 delivers oil through a pipe 56 to the inlet port 22 (see FIG. 1) and hence to the head of the regulating valve 31, then in non-regulating position. The beveling of the opposed ends of the valves 21 and 31 creates an annular chamber 57 which as such exists only when the selector valve 20 is in neutral position and with which the adjacent ends of the grooves 23 and 24 connect. Hence, low pressure oil delivered by the pump 20 with the engine idling flows through the port 22 to the chamber 57 and thence successively through a small port 58 that is uncovered by the regulating valve 31 in its non-regulating position, a port 59 and a recess 60 which connects with the sump 54, the latter two ports being formed in the casing 10. In FIG. 7, the recess 60 is shown as a pipe for convenience and also shown only ing this figure a pipe 61 connects the recess 60 with the bore 11 on the spring side of the regulating valve to drain oil therefrom and the bore 38 and insure free action of the springs 32 and 47, the pipe 61 being represented by port 60ª in FIGS. 1 and 2.

Referring to FIGS. 5 and 7, the radial passages 26 and 29 in the neutral position shown communicate at their outer ends with passages 62 and 63 which in turn connect through pipes 64 and 65 with the cylinders 66 and 67 in which operate pistons 68 and 69 of conventional, hydraulically actuated, forward and reverse friction clutches 70 and 71, all respectively, which are spring released when the pressure is removed. Also in the neutral position and referring to the same figures and to FIG. 1, the outer ends of the passages 27 and 28 communicate with a port 72 in the casing 10 which in turn connects with the recess 60 and hence with the sump 54. At the same time, the outer end of the passage 25 connects with the passage 50 and thence through the passage 48 with the chamber 45 at the head of the preloading piston 39. Since the inner ends of the passages 25 to 29, inclusive, terminate in the common chamber 30, it will be apparent that, with the selector valve 20 in the neutral position shown in the indicated figures, the clutch cylinders 66 and 67 and the chamber 45 connect through the ports and passages outlined above with the sump. Hence, the clutches 70 and 71 are released and the preloading piston 39 occupies the position shown in FIG. 1.

Assuming an idling engine and a system pressure then of not over 60 p.s.i., by way of example, oil delivered by the pump 51 flows through the port 22 (see FIG. 1), annular chamber 57, ports 58 and 59, and the recess 60 to the sump. This pressure may be insufficient to shift the regulating valve 31 and while it is present in the grooves 23 and 24, the latter are masked by the surface of the bore 11.

To establish engagement of the forward clutch 70 and assuming a full engaging pressure of 110 p.s.i., the selector valve 20 is rocked clockwise from the position shown in FIG. 7 to that shown in FIG. 3 and the engine is accelerated to take up the load. The groove 23 then registers with the passage 62 so that a pressure connection is established with the clutch cylinder 66; the radial passage 25 is moved out of registration with the passage 50 (see FIG. 5) so that the connection of the chamber 45 with the sump 54 is interrupted; and the groove 24 registers with the passage 50 and through the passage 48, a pressure connection is established with the chamber 45 and hence with the head of the preloading piston 39. At the same time, the reverse clutch cylinder 67 connects with the sump 54 through the pipe 65, passages 63, 28 and 26, port 72 and the recess 60.

Pressure begins rising in the inlet port 22 and also, through the groove 24, passages 50 and 48, in the chamber 45 where it is effective against the head of the preloading piston 39. The latter begins moving towards the left, as viewed in FIG. 1, and the annular rib 40 traps the oil in the chamber 43 which can escape only through the orifice 44. As the piston 39 continues to move, the spring 47 shifts the follower disk 33 to the position shown in FIG. 2 so that the spring 32 is further loaded or shortened and the shift of the pressure regulating valve 31 to the full regulating position shown in FIG. 2 must be made against the preloaded spring 32 which is backed up by the pressure loaded disk 33. Expressed in another way, the rate of preloading of the spring 32 by the follower disk 33 is controlled by the escape rate of the oil through the orifice 44. The spring 32 determines the final regulating position of the valve 31 and the preloading piston 39 is held in the position shown in FIG. 2 because of the larger diameter of the bore 38 relative to the bore 11.

By virtue of the foregoing, it will be apparent that there is a definite lengthening of the time required for the regulating valve spring 32 to determine the final regulating position of the valve 31 with a consequent delay in the build up of pressure in the clutch cylinder 66 and a softer engagement of the clutch 70. If a system pressure of 60 p.s.i. is assumed in the inlet port 22 with the selector valve 20 in neutral, this pressure may drop to from 20 to 30 p.s.i. immediately after this valve is shifted to forward position due to the oil flowing into the empty clutch cylinder 66 and this pressure shifts the clutch piston 68 to take up the clearance between the clutch plates and compresses the release springs. The pressure in the cylinder 66 thereafter builds up to the full assumed actuating pressure of 110 p.s.i.

It has been determined with a particular clutch that, if the preloading piston 39 and allied parts are not employed, the time interval between the shifting of the selector valve 20 to forward or open position and the attainment of the clutch engaging pressure is of the order of about ⅓ sec. With the preloading piston 39, however, this interval is increased to from 1 to 1.3 secs., i.e., the pressure rise in the cylinder 66 is delayed to that extent so that the clutch engagement is more gentle. The increased time for engagement varies with the size of the orifice 44, the volume of oil trapped in the chamber 43, to some extent on the oil viscosity, and also on whatever leakage occurs along the outer surface of the preloading piston 39. The advantages outlined above are present regardless of how fast the selector valve 20 is shifted from neutral to forward, the time delay in pressure rise being obtainable under any speed shifting of this valve.

When the selector valve 20 is returned to the neutral position shown in FIGS. 1, 5 and 7, the clutch cylinder 66 connects with the sump 54 through the noted ports and passages and the clutch 70 is released, while pump pressure on the head of the preloading piston 39 is interrupted due to registration of the passages 25 and 50 (see FIG. 5) which then provide a sump connection. The spring 32 being stronger than the spring 47 then returns the regulating valve 31 and the follower disk 33 to the positions shown in FIG. 1, while the spring 47 returns the preloading piston 39 to the position also shown in the latter figure. This return movement of the piston 39 also refills the chamber 43.

To engage the reverse clutch 71, the selector valve 20 is rotated counterclockwise from the positions shown in FIGS. 5 and 7 to that shown in FIG. 4. The groove 24 then connects through the passage 63 and pipe 65 with the clutch cylinder 67 while the groove 23 connects through the passage 50 with the passage 48 and thence with the head of the preloading piston 39. The cooperative action of the regulating valve 31 and piston 39 with respect to the time delay in the rise of pressure in the clutch cylinder 67 is identical with that heretofore described. With the reverse clutch 71 engaged, the forward clutch cylinder 66 connects with the sump 54 through the pipe 64, passages 62, 27 and 29, port 72 and recess 60, and is released.

In FIGS. 8 to 12, inclusive, is shown a modified combination unit comprising selector and pressure regulating valves which is characterized by a somewhat simpler arrangement and a capacity for more rapid across neutral shifting from forward to reverse and vice versa.

Referring to FIG. 8, the numeral 73 designates an elongated casing having coaxial, cylindrical bores 74 and 75, the latter bore having a larger diameter than the former for the same reason as indicated for the comparable bores 11 and 38 in FIG. 1, and the junction of the bores 74 and 75 creates an annular shoulder 76. The left end of the bore 74 is closed by a plate 77 through which extends a rockable stem 78 having attached thereto externally of the casing 73 an actuating handle 79 while inwardly of the casing 73, the stem 78 is enlarged to provide a cylindrical portion 80 whose periphery is notched in three locations for selective engagement with a spring actuated pawl (not shown) to respectively determine forward drive, neutral and reverse drive. The details of this arrangement are identical with those shown in FIG. 6.

Adjacent the notched portion 80 and integrally formed therewith is a cylindrical selector valve 81 which snugly fits the bore 74 and from which coaxially extends a reduced boss 82 of convenient length. The indicated right end of the selector valve 81 is positioned so that a pressure inlet port 83, corresponding to the inlet port 22 in FIG. 1, is always open.

Spaced passages 84 and 85 (see FIGS. 8, 9 and 10) extend longitudinally of the selector valve 81 for a convenient distance from the right end thereof and communicate, respectively, with radial passages 86 and 87 which extend to the cylindrical surface of the valve 81. This valve is also slotted at 88 in generally coplanar relation to the radial passages 86 and 87 and this slot defines with the bore 74 a parti-cylindrical chamber 89 which, when the valve 81 occupies the neutral position shown in FIG. 10, is located below and spaced from the longitudinal passages 84 and 85 and communicates through a parti-diametral passage 90 in the selector valve 81 with a transverse passage 91 in the casing 73. Further, and in any position of the selector valve 81, the chamber 89 connects through a port 92 and a recess 93 in the casing 73 with the sump 54, the recess 93 corresponding to the recess 60 in FIG. 1.

The casing 73 also includes a longitudinal passage 94 which at the left end connects with the transverse passage 91 and whose opposite end is enlarged at 95 to receive a spring 96 which biases a ball valve 97 into closing relation to a port 98 provided in a plate 99 that is clamped against the right end of the casing by a cover 100.

The plate 99 also includes a throttling orifice 101 which provides constant communication between the passage 95 and a recess 102 in the cover 100 which in turn communicates through an opening 103 in the plate 99 with the head of a cup-shaped, preloading piston 104 which reciprocates in the bore 75 and corresponds to the similar piston 39 in FIG. 1. The opening 103 is sized so that a substantial part of the head of the piston 104 is exposed to whatever pressure exists in the chamber 102.

In the neutral position of the device (see FIGS. 8 and 10), the preloading piston 104 is held in contact with the plate 99 by one end of a spring assembly consisting of telescoped helical springs 105 and 106 which functionally may be regarded as one spring and whose opposite ends bear against the inner side of the head of a cup-shaped, pressure regulating valve 107 which is reciprocable in the bore 74. When the selector valve 81 is in the neutral position shown in FIGS. 8 and 10 and the engine is not running, the extension of the springs 105 and 106 will cause the pressure regulating valve 107 to abut the boss 82, but when the engine is idling, the oil pressure will slightly shift the pressure regulating valve 107 to the position shown in FIG. 8 where it slightly uncovers the port 108 which connects with the recess 93. The discharge of the oil pump 51 under these conditions will therefore flow to the sump 54. Further, any oil that may leak into the bores 74 and 75 between the preloading piston 104 and pressure regulating valve 107 is constantly drained to the sump 54 through a port 109 which connects with the recess 93 so that the free action of the springs 105 and 106 is maintained at all times.

Considering an idling condition of the engine and the selector valve 81 in the neutral position shown in FIG. 10, the recess 102 communicates with the sump 54 through passages 95, 94, 91 and 90, and the chamber 89. The latter chamber also connects with passages 110 and 111 in the casing 73 which correspond to passages 62 and 63 in FIG. 5 and hence connect with the forward and reverse clutches 70 and 71, respectively, so that these clutches are released. At the same time, the outer ends of the radial passages 86 and 87 are masked by the bore 74.

To engage the forward clutch 70, the selector valve 81 is rocked clockwise to the position shown in FIG. 11 wherein it will be apparent that the passage 111 still connects with the sump 54 so that the reverse clutch 71 remains disengaged. The radial passage 86 now communicates with the passage 110 leading to the cylinder of the forward clutch 70, while the radial passage 87 communicates through the passages 91, 94, 95 and orifice 101 with the recess 102 so that pressure may be applied to the head of the preloading piston 104. With the engine accelerated to take up the load, the operation is generally the same as outlined for FIG. 1 in that the shift of the pressure regulating valve 107 to full regulating position must be against the preloading of the springs 105 and 106 by the piston 104 whose limiting position towards the left is determined by the shoulder 76. The variables affecting how slowly the clutch actuating pressure rises are the size of the orifice 101, the chamber volume behind the preloading piston 104, the spring thrust and the rate of load change.

When the selector valve 81 is rocked to the neutral position (FIG. 10), the cylinder of the forward clutch 70 empties through the passage 110 to the sump 54 and the passage 91 also connects with the sump through the passage 90. The extension of the springs 105 and 106 returns the pressure regulating valve 107 and the preloading piston 104 to the positions shown in FIG. 8 and the oil hitherto behind the latter piston is primarily freely discharged through the port 98 to the sump, the ball valve 97 being unseated.

For reverse operation, the selector valve 81 is rocked counterclockwise to the position shown in FIG. 12 which thus feeds oil pressure to the reverse clutch 71 and to the preloading piston 104 under the conditions noted above, the forward clutch 70 being released.

Compared to the FIG. 1 valving control, the FIG. 8 unit is characteried by a greater rapidity of across neutral shifting from forward to reverse and vice versa. The pressure behind the preloading piston 104 discharges freely through the port 98 as the selector valve 81 passes through neutral and there is no necessity for the springs 105 and 106 overcoming a partial vacuum as obtains in the chamber 43 in FIG. 1 as the preloading piston 39 moves towards the right.

I claim:

1. The combination of a liquid actuated clutch including friction plates movable between released and engaged positions, a source of liquid pressure, a casing having an inlet port communicating wtih the liquid pressure source and a bore, a selector valve movable in the bore between positions connecting and disconnecting the inlet port to the clutch, a pressure regulating valve shiftable in the bore for determining the value of the clutch engaging pressure and having one end exposed to the supplied liquid pressure and in opposed relation to the adjacent end of the selector valve, a member slidable in an axially aligned bore portion having a larger diameter than the first named bore and exposed to and movable by the source pressure when the selector valve is in connecting position, spring means interposed between the pressure regulating valve and member whereby the spring means is loaded by movement of the member, and means for regulating movement of the member at a controlled rate.

2. In pressure regulating valve construction, the combination of a casing having an inlet port connectible to a source of liquid pressure, an outlet port and a bore, a selector valve movable in the bore between positions connecting and disconnecting the inlet and outlet ports, a pressure regulating valve shiftable in the bore for determining the value of the pressure in the outlet port and having one end exposed to the inlet port pressure and in opposed relation to the adjacent end of the selector valve, a member slidable in an axially aligned bore portion having a larger diameter than the first named bore and exposed to and movable by the inlet port pressure when the selector valve is in connecting position, spring means interposed between the pressure regulating valve and member whereby the spring means is loaded by movement of the member, and means for regulating movement of the member at a controlled rate.

3. A structure as defined in claim 1 wherein the supplied liquid pressure passes through a throttling orifice before reaching the member.

4. A combination as defined in claim 3 wherein the liquid pressure acting on the member is freely discharged through valve normally biased to a closed position when the selector valve is moved to a disconnecting position.

5. A structure as defined in claim 2 wherein the inlet port pressure passes through a throttling orifice before reaching the member.

6. The combination of a liquid actuated clutch including friction plates movable between released and engaged positions, a source of liquid pressure connectible with the clutch to engage the friction plates, a pressure regulating valve for regulating the source pressure between a relatively low value when the clutch is released and a maximum value when the clutch is fully engaged, spring means loading the valve against the source pressure to establish the relatively low pressure, and source pressure actuated means for further loading the spring means to delay rise of the source pressure from the relatively low value to maximum value including means for determining the rate of such further loading.

7. A combination as defined in claim 6 wherein a selector valve is movable between positions determining the release and full engagement of the clutch and the source pressure is effective against the source pressure actuated means only when the selector valve is in clutch engaging position.

8. The combination of a liquid actuated clutch including friction plates movable between released and engaged positions, a source of liquid pressure, a selector valve movable between positions connecting and disconnecting the liquid pressure source with and from the clutch, respectively, a pressure regulating valve, spring means loading the regulating valve against the source pressure to establish a relatively low pressure when the selector valve is in disconnecting position, and means actuated by source pressure when the selector valve is moved to connecting position for further loading the spring means and providing a delay in the rise of the pressure acting on the clutch to maximum engaging pressure including means for determining the rate of such further loading.

9. A combination as defined in claim 8 wherein further loading of the spring means is accomplished by source pressure under the control of the selector valve.

10. A combination as defined in claim 1 wherein a spring biases the regulating valve into contact with the selector valve when in disconnecting position and yielding means are disposed between the spring and member.

11. A combination as defined in claim 10 wherein the controlled rate movement of the member is regulated by means for trapping a mass of the liquid and a throttling orifice in the member through which the trapped liquid escapes when the member is moved by the actuating pressure.

12. A combination as defined in claim 2 wherein further loading of the spring means is accomplished by source pressure under the control of the selector valve.

13. The combination of a liquid actuated clutch including friction plates movable between released and engaged positions, a source of liquid pressure connectible to the clutch to engage the friction plates, a pressure regulating valve for regulating the source pressure between a relatively low value when the clutch is released and a maximum value when the clutch is fully engaged, and means for delaying rise of the source pressure from the relatively low to maximum value including spring means loading the valve against the source pressure, and source pressure actuated means for further loading the spring means to delay rise of the source pressure from the relatively low to maximum value.

14. A combination as defined in claim 13 wherein a selector valve is movable between positions determining the release and full engagement of the clutch and the delay means is under the control of the selector valve.

References Cited in the file of this patent

UNITED STATES PATENTS

| | | |
|---|---|---|
| 2,144,074 | Maybach | Jan. 17, 1939 |
| 2,338,546 | Scholl | Jan. 4, 1944 |
| 2,633,760 | Kelley | Apr. 7, 1953 |
| 2,702,618 | Baker et al. | Feb. 22, 1955 |
| 2,720,294 | Hindmarch | Oct. 11, 1955 |
| 2,721,640 | De Feo | Oct. 25, 1955 |
| 2,756,851 | Collins | July 31, 1956 |

FOREIGN PATENTS

| | | |
|---|---|---|
| 647,508 | Germany | July 6, 1937 |